United States Patent
Vitito

(10) Patent No.: US 8,070,224 B2
(45) Date of Patent: Dec. 6, 2011

(54) VEHICLE ENTERTAINMENT SYSTEM INCORPORATED WITHIN THE ARMREST/CONSOLE OF A VEHICLE

(75) Inventor: Christopher J. Vitito, Celebration, FL (US)

(73) Assignee: Audiovox Corporation, Hauppauge, NY (US)

( * ) Notice: Subject to any disclaimer, the term of this patent is extended or adjusted under 35 U.S.C. 154(b) by 961 days.

(21) Appl. No.: 11/173,058

(22) Filed: Jul. 5, 2005

(65) Prior Publication Data

US 2006/0258441 A1    Nov. 16, 2006

Related U.S. Application Data

(60) Provisional application No. 60/672,883, filed on Apr. 20, 2005.

(51) Int. Cl.
*B60N 2/46* (2006.01)

(52) U.S. Cl. .............. 297/217.3; 297/188.16; 296/24.34

(58) Field of Classification Search ............. 297/188.14, 297/188.15, 188.16, 188.18, 217.3; 296/24.34, 296/37.8
See application file for complete search history.

(56) References Cited

U.S. PATENT DOCUMENTS

| | | | |
|---|---|---|---|
| 4,690,362 A | 9/1987 | Helgeland | |
| 5,161,766 A | 11/1992 | Arima | |
| 5,177,616 A | 1/1993 | Riday | |
| 5,179,447 A * | 1/1993 | Lain | 297/217.3 |
| 5,222,780 A | 6/1993 | Reh et al. | |
| 5,316,369 A * | 5/1994 | Kanda | 297/188.15 |
| 5,338,081 A | 8/1994 | Young et al. | |
| 5,374,104 A | 12/1994 | Moore et al. | |
| 5,398,991 A | 3/1995 | Smith et al. | |
| 5,436,792 A | 7/1995 | Leman et al. | |
| 5,544,010 A | 8/1996 | Schultz et al. | |
| 5,667,179 A | 9/1997 | Rosen | |
| 5,751,548 A | 5/1998 | Hall et al. | |
| 5,946,055 A | 8/1999 | Rosen | |
| 6,007,036 A | 12/1999 | Rosen | |
| 6,023,411 A | 2/2000 | Howell et al. | |
| 6,049,450 A | 4/2000 | Cho et al. | |
| 6,208,508 B1 | 3/2001 | Ruch et al. | |
| 6,256,837 B1 * | 7/2001 | Lan et al. | 16/334 |
| 6,279,977 B1 | 8/2001 | Chen | |
| 6,409,242 B1 * | 6/2002 | Chang | 296/37.7 |
| 6,443,574 B1 * | 9/2002 | Howell et al. | 353/13 |
| 6,494,527 B1 | 12/2002 | Bischoff | |
| D469,747 S | 2/2003 | To et al. | |
| 6,522,368 B1 | 2/2003 | Tuccinardi et al. | |
| 6,556,435 B1 | 4/2003 | Helot et al. | |
| 6,633,347 B2 * | 10/2003 | Kitazawa | 348/837 |
| 6,663,155 B1 | 12/2003 | Malone et al. | |
| 6,683,786 B2 | 1/2004 | Yin et al. | |
| 6,702,238 B1 | 3/2004 | Wang | |
| 6,717,798 B2 | 4/2004 | Bell et al. | |
| 6,719,343 B2 | 4/2004 | Emerling et al. | |

(Continued)

FOREIGN PATENT DOCUMENTS

DE    3927749    2/1991

(Continued)

*Primary Examiner* — Peter R. Brown

(74) *Attorney, Agent, or Firm* — F. Chau & Associates, LLC

(57) ABSTRACT

A vehicle entertainment system includes a video system mounted within an automobile armrest/console, the armrest/console including an upper support surface. The video system includes an integrated housing supporting a video monitor and a video source.

7 Claims, 3 Drawing Sheets

U.S. PATENT DOCUMENTS

| | | |
|---|---|---|
| 6,746,065 B1 | 6/2004 | Chan |
| 6,758,521 B2 | 7/2004 | Imamura et al. |
| 6,890,012 B2 | 5/2005 | Maierholzner |
| 6,899,365 B2 * | 5/2005 | Lavelle et al. ............. 296/37.15 |
| D508,900 S | 8/2005 | Kawano et al. |
| 6,926,329 B2 | 8/2005 | Neumann et al. |
| 6,928,654 B2 | 8/2005 | Tranchina et al. |
| 6,945,582 B2 | 9/2005 | Chen |
| 6,997,494 B2 | 2/2006 | Neumann |
| 6,997,508 B2 | 2/2006 | Jaaska, Sr. |
| 7,084,932 B1 * | 8/2006 | Mathias et al. ............... 348/837 |
| D535,957 S | 1/2007 | Vitito |
| 7,176,987 B2 | 2/2007 | Liu |
| 7,261,266 B2 | 8/2007 | Satterfield |
| D551,197 S | 9/2007 | Vitito |
| 7,399,033 B2 | 7/2008 | Hsiao |
| 7,490,887 B2 | 2/2009 | Vitito |
| 7,604,291 B2 | 10/2009 | Vitito |
| 2002/0003875 A1 | 1/2002 | Stewart et al. |
| 2002/0140632 A1 | 10/2002 | Shah |
| 2003/0042378 A1 | 3/2003 | Imamura et al. |
| 2003/0137584 A1 | 7/2003 | Norvell et al. |
| 2004/0017652 A1 | 1/2004 | Billington et al. |
| 2004/0061995 A1 | 4/2004 | McMahon |
| 2004/0104905 A1 | 6/2004 | Chung et al. |
| 2004/0130616 A1 | 7/2004 | Tseng |
| 2004/0175155 A1 | 9/2004 | Liu |
| 2004/0189797 A1 | 9/2004 | Todd et al. |
| 2004/0227696 A1 | 11/2004 | Schedivy |
| 2004/0237111 A1 | 11/2004 | Iraclianos et al. |
| 2004/0245796 A1 | 12/2004 | Maierholzner |
| 2004/0248543 A1 | 12/2004 | Itsukaichi |
| 2005/0053365 A1 | 3/2005 | Adams et al. |
| 2005/0066369 A1 | 3/2005 | Chang |
| 2006/0128303 A1 | 6/2006 | Schedivy |
| 2006/0152026 A1 | 7/2006 | Rist |

FOREIGN PATENT DOCUMENTS

| | | |
|---|---|---|
| JP | 05-131879 | 11/1991 |
| JP | 2002-533258 | 10/2002 |

* cited by examiner

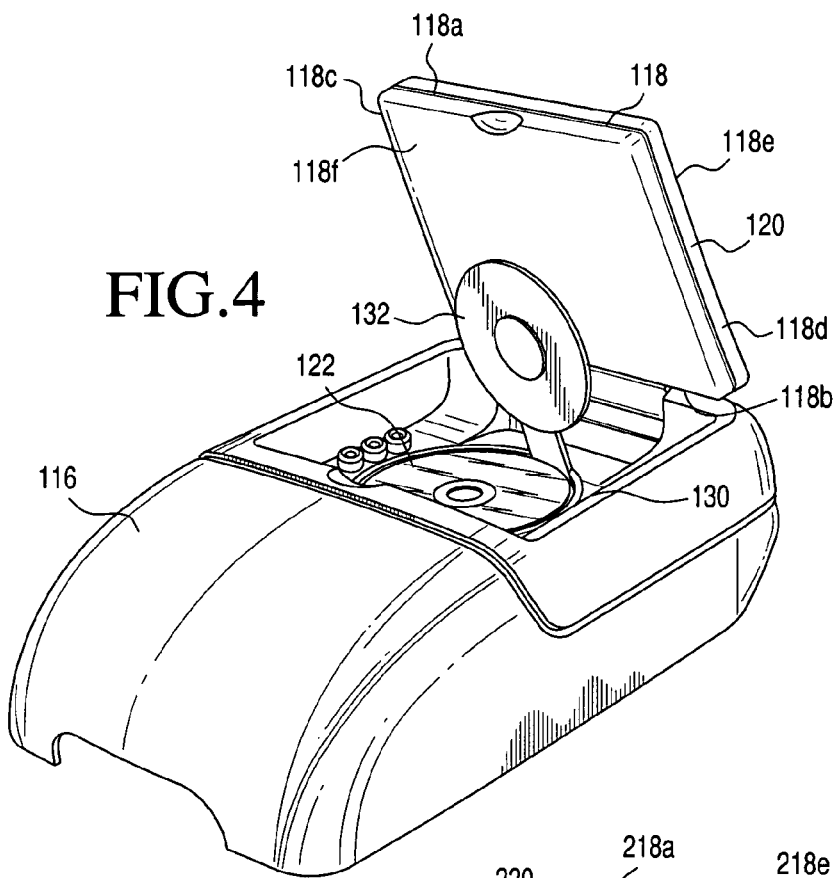
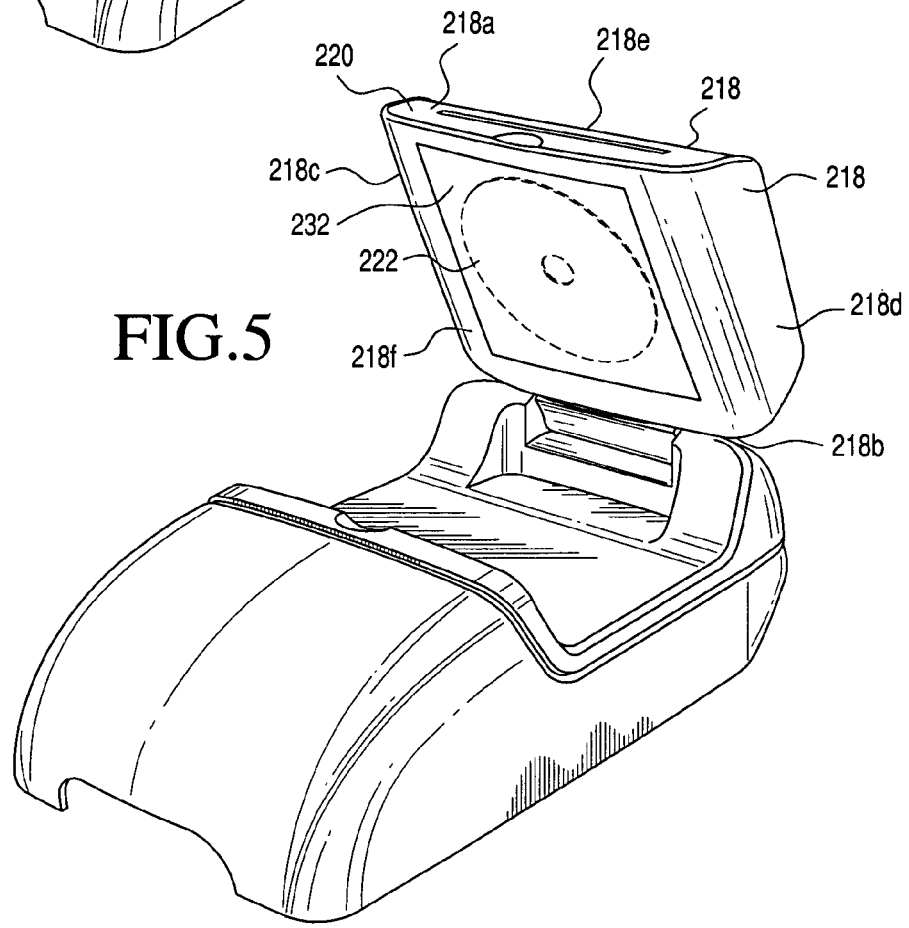

VEHICLE ENTERTAINMENT SYSTEM INCORPORATED WITHIN THE ARMREST/CONSOLE OF A VEHICLE

CROSS REFERENCE TO RELATED APPLICATIONS

This application is based upon U.S. Provisional Application Ser. No. 60/672,883, filed Apr. 20, 2005, entitled "AUTOMOBILE ENTERTAINMENT SYSTEM INCORPORATED WITHIN THE CENTRAL ARMREST/CONSOLE OF AN AUTOMOBILE".

BACKGROUND OF THE INVENTION

1. Field of the Invention

The invention relates to a vehicle entertainment system. More particularly, the invention relates to an entertainment system integrating a video source and video monitor within the central armrest/console of an automobile.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, a variety of systems and techniques for integrating entertainment systems within an automobile have been developed.

For example, headrest entertainment systems have been developed and allow multiple individuals to view a variety of different video sources within the same vehicle. However, some automobiles are not suited for the utilization of headrest entertainment systems and, therefore, are unable to take advantage of this advancement in technology. Similarly, only larger vehicles can take advantage of the overhead systems commonly found in automobiles.

With this in mind, alternate techniques for implementing entertainment systems within automobiles are needed. The present invention attempts to add to the choices consumers have by providing an automobile entertainment system that may be integrated within the central armrest/console of an automobile.

SUMMARY OF THE INVENTION

It is, therefore, an object of the present invention to provide a vehicle entertainment system including a video system mounted within an automobile armrest/console, the armrest/console including an upper support surface. The video system includes an integrated housing supporting a video monitor and a video source.

It is also an object of the present invention to provide an entertainment system wherein the video source is a DVD player or hard drive.

It is another object of the present invention to provide an entertainment system wherein the video source is accessed from behind the video monitor.

It is a further object of the present invention to provide an entertainment system wherein the upper support surface is an armrest module.

It is also an object of the present invention to provide an entertainment system wherein the armrest module is selectively removeable from the armrest/console.

It is another object of the present invention to provide an armrest/console incorporating a vehicle entertainment system.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWING

FIGS. 4 and 5 are rear perspective views of alternate embodiments of the present automobile entertainment system showing various DVD player configurations contemplated in accordance with the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
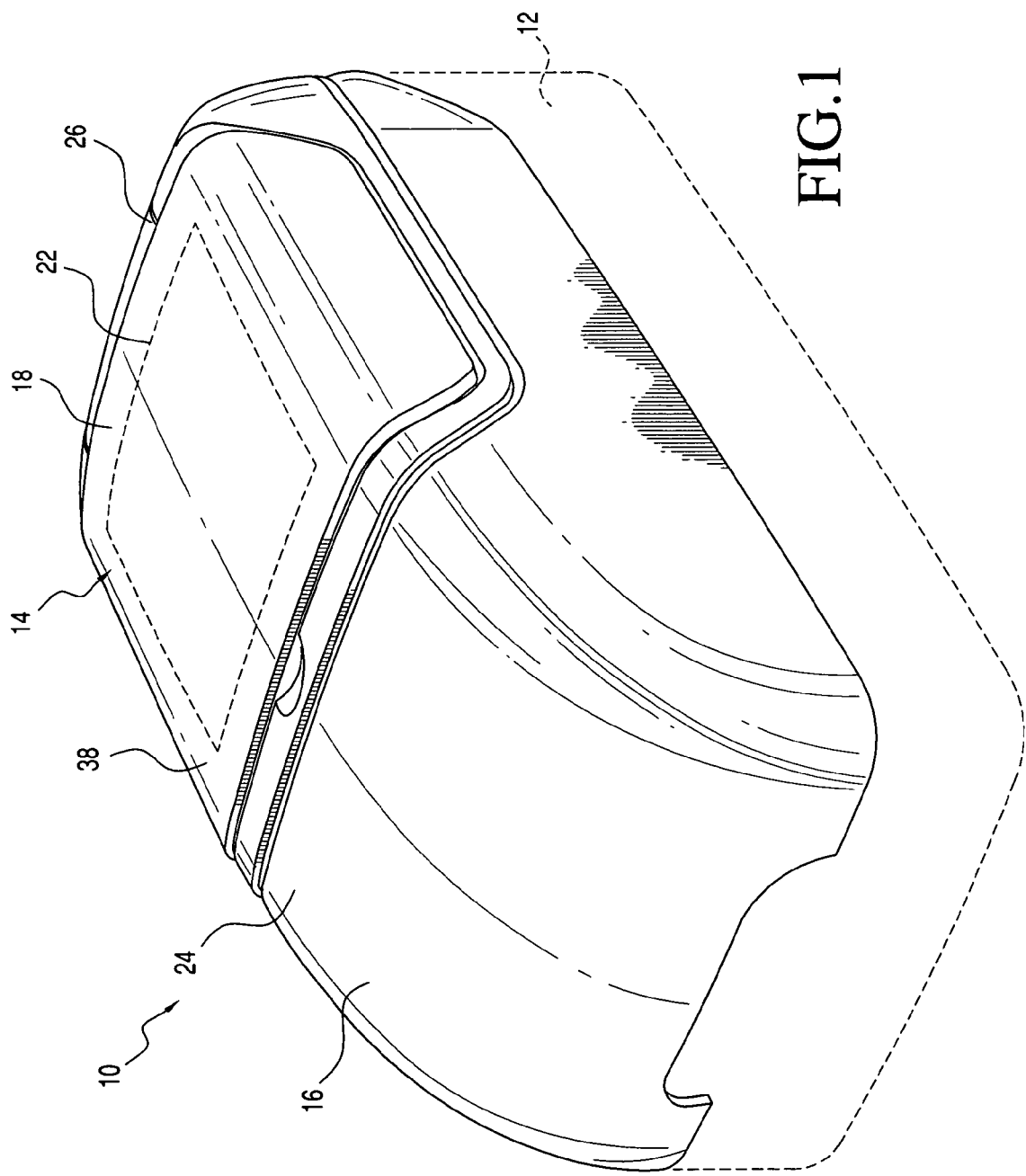
FIG. 1 is a front perspective view of the present central armrest/console automobile entertainment system with the video monitor in its closed position.
Figure 2:
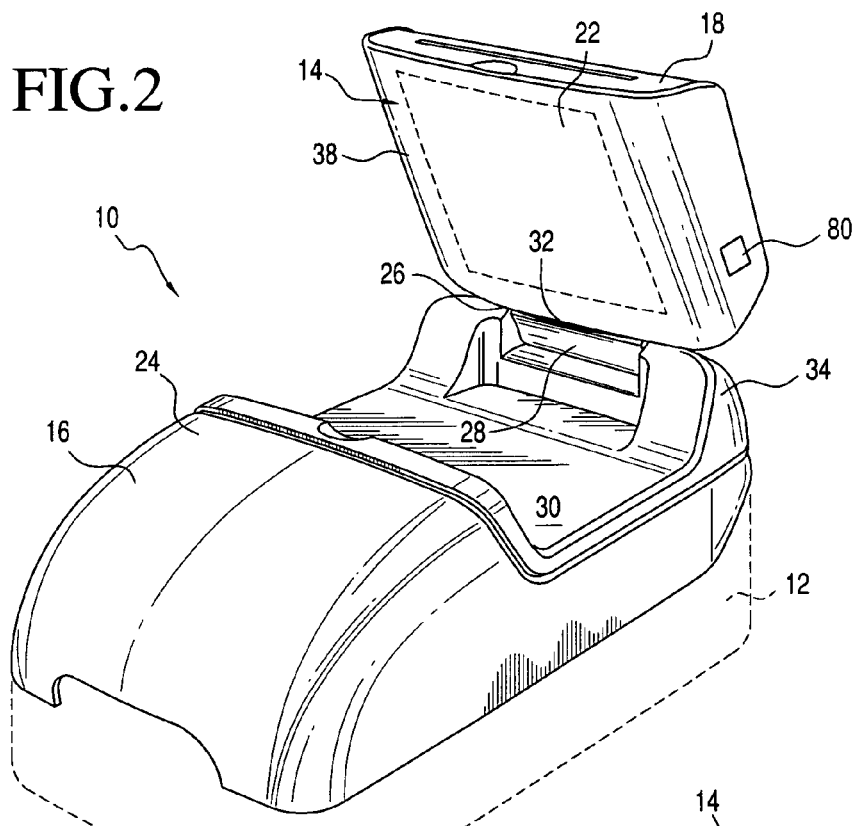
FIG. 2 is a front perspective view of the present automobile entertainment system with the video monitor in its viewing position.
Figure 3:
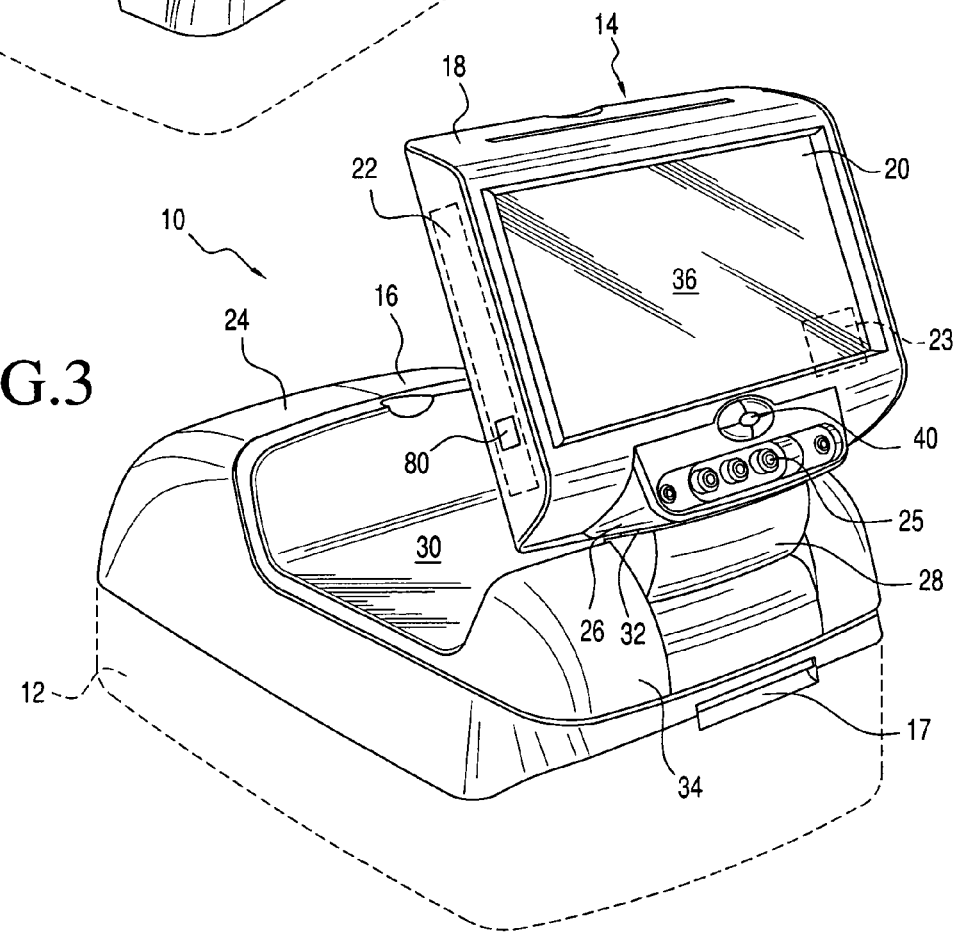
FIG. 3 is a rear perspective view of the present automobile entertainment system with the video monitor in its viewing position.

With reference to FIGS. 1 to 3, and in accordance with a first embodiment of the present invention, an automobile entertainment system 10 is disclosed. The automobile entertainment system 10 is composed of a series of video and audio components integrated within a central armrest/console 12 of a traditional automobile. In particular, the entertainment system 10 includes a video system 14 mounted within an armrest module 16 adapted for connection with the armrest/console 12 of a traditional automobile. Although the present invention is described herein with reference to an automobile, those skilled in the art will readily appreciate the system may be employed in a variety of vehicles, for example, boats or planes, without departing from the spirit of the present invention. The video system 14 generally includes a housing 18 in which a video monitor 20 and video source 22 are supported. The housing 18, with the video monitor 20 and video source 22, is integrated with the armrest module 16 which functions as both a support for the video monitor 20/video source 22 and the upper support surface 24 of the armrest/console 12. Although the present invention is adapted for use in conjunction with the center armrest/console of a vehicle, the concepts underlying the present invention could readily be applied to other support, storage and/or console type structures (for example, within a door of a vehicle) found within an automobile.

The armrest module 16 is modular in design and is adapted for use within a variety of automobiles by simply changing the appearance and shape of the armrest module 16 so it matches the armrest/console 12. In particular, many automobiles today include an armrest/console with a storage compartment (not shown) formed therein. The storage compartment is commonly accessed via a hinged upper support surface 24 that is pivoted toward the rear seat of the automobile to expose the contents of the storage cavity formed within the armrest/console 12. It is this upper support surface 24 which is replaced by the present entertainment system for conveniently installing an entertainment system within an automobile.

By employing the present entertainment system 10, a video system 14 may be installed within a variety of vehicles regardless of the ceiling height or headrest dimensions by simply replacing the upper support surface of the factory installed armrest/console with the present armrest module 16. As those skilled in the art will certainly appreciate, the present armrest module 16 is provided with a hinge structure 17 adapted for ready attachment to the existing structure of the automobile. Further, and as those skilled in the art will also certainly appreciate, the hinge structure may be varied to suit the automobile for which the armrest module is designed.

In accordance with a preferred embodiment of the present invention, the video source 22 is a DVD player coupled to the video monitor 20 for the transmission of video content thereto. That is, the DVD player 22 or other video source is integrated within the same housing 18 as the video monitor 20. It is also contemplated that a hard drive 23 video source may also be integrated with the video monitor 16. As those skilled in the art will certainly appreciate the hard drive 23 will include inputs for receiving video content and output for transmitting video content to the video monitor 16, both of which are well known to those skilled in the art. The video system 14 is further provided with RCA ports 25 for connection of other video sources. However, and as discussed below in greater detail, the video source may take a variety of forms without departing from the spirit of the present invention; for example, and not limited to, satellite video systems and Bluetooth wireless based systems. In addition, and as discussed below, the video source may be housed at a location separate from the video monitor without departing from the spirit of the present invention.

The video system 14 is pivotally mounted to the armrest module 16 in a manner permitting storage and retrieval thereof. More particularly, the base 26 of the video system 14 is pivotally mounted to the armrest module 16 in a manner that permits rotation of the video system 14 about multiple axes. A first hinge 28 facilitates rotation of the video monitor 20 from its storage position within a recess 30 formed in the armrest module 16 to an upstanding position for viewing thereof. The second hinge 32 permits rotation of the video monitor 20 about an axis substantially perpendicular to the axis of the first hinge 28. As such, the second hinge 32 allows for rotation of video monitor 20 in a manner that facilitates both viewing and protection of the video monitor 20. Although a specific hinge structure is disclosed in accordance with a preferred embodiment, various hinge structures could be employed without departing from the spirit of the present invention.

In particular, the base 26 of the video system 14 is pivotally secured to the armrest module 16 at a position adjacent to the rear 34 of the armrest module 16. When the video monitor 20 is in its storage position within the recess 30 of the armrest module 16, it is oriented with the video screen 36 facing downward and the back 38 of the video monitor 20 facing upward. As such, the back 38 of the video system 14 functions as part of the armrest/console 12 when the video monitor 20 is in its storage position.

When one wishes to watch a presentation on the video system 14 from the back seat of the automobile, the video monitor 20 is lifted from the recess 30 within the armrest module 16, rotated upward about the first hinge 28 and then rotated approximately 180 degrees about the second hinge 32 such that the video screen 36 faces the backseat of the automobile.

The video monitor 20, DVD player 22 and associated control components are mounted within the housing 18 of the video system 14. In accordance with a preferred embodiment, the video monitor 20 is a TFT LCD screen. However, it is contemplated that other monitor constructions, for example, plasma, Ultra High Definition VGA, touch screen VGA, organic LED, fabric based monitors (e.g., flexible TFT), etc., may be used without departing from the spirit of the present invention.

With regard to the DVD player 22, it is structured as a top slot loading DVD player known to those skilled in the art. It is integrally molded within the housing 18 and positioned for insertion of DVDs behind the video monitor 20. By mounting the DVD player 22 in this way, a stable structure is developed that is well adapted for the automobile environment. It is contemplated the DVD player may also be a side loaded design with the slot located either on the left or right side of the housing.

While the DVD player is disclosed as being a slot-loaded design with insertion behind the video monitor, the DVD player could take a variety of other forms while still being integrated with the video monitor and/or the armrest module. For example, and with reference to FIG. 4, the DVD player 122 may be positioned beneath the pivotally mounted video monitor 120 and video monitor housing 118, and within the recess 130 of the armrest module 116 allowing for insertion of DVDs beneath the video monitor 120 when the video monitor 120 is in an open position. As the video monitor housing includes a top 118a, bottom 118b, first and second sides 118c, 118d, front surface 118e and rear surface 118f, the DVD player 122 is mounted within the recess 130 of the armrest module 116 such that the DVD player 122 may be accessed for loading and unloading of DVDs when the video monitor housing 118 is pivoted forward. This embodiment includes a pivotally supported cover 132 providing selective access for the retrieval and insertion of new DVDs. With reference to FIG. 5, the DVD player 222 may be integrated with the backside, or rear surface, 218e of the video monitor housing 218 that includes a top 218a, bottom 218b, first and second sides 218c, 218d, front surface 218e and rear surface 218f. DVDs are snapped into DVD player 222, allowing for insertion of DVDs behind the video monitor 220 when the video monitor housing 218 is in an open position. As with the DVD player disclosed with reference to FIG. 4, the DVD player 222 is provided with a pivotally supported cover 232 allowing for selective access for the retrieval and insertion of new DVDs. The slot loaded design may also be varied to allow for slot loading on either the right or left side of the video system. In addition, the DVD player may be designed with a built in TV tuner for providing the user with a choice of video sources.

Control of the video system 14, including the video monitor 20, DVD player 22, hard drive 23 and other components of the video system 14, is facilitated by the provision of control buttons 40 along the outer surface of the video system 14. In accordance with a preferred embodiment of the present invention, the control buttons 40 take the form of a multifunction controller permitting movement of a cursor shown upon various interfaces displayed upon the video monitor. In addition, conventional control buttons may also be provided for control of traditional functions. In addition to the provision of manual control buttons, the video system may further include a remote control (not shown) such that an individual need not actually touch the video system to control the video content or the volume generated by the video system. Once again, and as those skilled in the art will certainly appreciate, a variety of remote control systems may be utilized without departing from the spirit of the present invention. The system 14 may also be provided with inputs 44 for audio/visual content coming from remote sources, for example, gaming units, video players, etc.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

In addition to contemplated hardwiring of the present video system within an automobile, the system may be design for quick installation by a vehicle owner. With this in mind, and as those skilled in the art will certainly appreciate the present video system may be designed for simply plugging it into a power source (for example, a cigarette lighter) commonly found in vehicles. In accordance with such and embodiment, the video system would be provided with a pass through for access to wires linking the video system to a power source and/or external speakers.

The present video system 14 is provided with the ability to offer a variety of functionalities. These functionalities may be hardwired or programmed within the video system 14 or the functionalities may be added in a modular manner via an expansion slot 80 provided within the video system 14. Contemplated functionalities include, but are not limited to, satellite radio (for example, Serius, XM, Pictel phone satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc. Additional details regarding the implementation of such features are found in commonly owned U.S. patent application Ser. No. 11/153,364, entitled "VEHICLE ENTERTAINMENT SYSTEM INCLUDING A DETACHABLE FUNCTIONAL MODULE HOUSED WITHIN A DETACHABLE VIDEO SYSTEM", filed Jun. 16, 2005, which is incorporated herein by reference.

In addition, and in accordance with a preferred embodiment, a broadcast television receiver 46 is integrated with the video monitor 20 and/or the armrest module 16. More particularly, and with reference to FIG. 2, the housing 18 is provided with a rear recess 48 shaped and dimensioned for receiving a television receiver 46. The television receiver 46 may, therefore, be wired for use in conjunction with the video monitor in a manner known to those skilled in the art.

The television receiver 46 is further provided with an antenna 50. The antenna 50 is electrically connected to the television receiver 46 for the transmission of over-the-air signals. As those skilled in the art will certainly appreciate, the antenna may take a variety of forms without departing from the spirit of the present invention. In addition, and as those skilled in the art will certainly appreciate, the antenna may be wired or wirelessly connected to the television receiver, and take a variety of forms, without departing from the spirit of the present invention.

Although the present invention is disclosed herein as including a single monitor, it is contemplated the system could be designed with dual monitors for viewing from opposite sides of the vehicle. Such a system could include distinct DVD players associated with each monitor or a single DVD player linked to both monitors.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A vehicle entertainment system, comprising:
an armrest module pivotally mounted within an automobile armrest/console, the armrest/console including an upper support surface which is composed of the armrest module, a video system is mounted within the armrest module for movement about a first axis and a second axis substantially perpendicular to the first axis and for selective movement between an open orientation for use of the video system and a storage position;
the video system including an integrated housing supporting a video monitor and a video source, the housing including a front surface and a rear surface opposite the front surface, the rear surface functioning as part of the upper support surface when the video system is in its storage position,
wherein the housing further includes first and second sides opposite each other, the first and second sides functioning as parts of opposite sides of the armrest module when the housing is disposed in a recess of the armrest module, the recess having third and fourth sides, each of the third and fourth sides is shaped as a pair of oblique edges with a straight edge between the oblique edges, and each of the first and second sides is shaped as a pair of oblique edges with a straight edge between the oblique edges,
wherein the shape of the first side is conformal with the shape of the third side when the housing is disposed in the recess and the shape of the second side is conformal with the shape of the fourth side when the housing is disposed in the recess.

2. The entertainment system according to claim 1, wherein the video source is a DVD player or hard drive.

3. The entertainment system according to claim 1, wherein the video source is accessed from behind the video monitor.

4. The entertainment system according to claim 1, wherein the armrest module is selectively removeable from the armrest/console.

5. An armrest/console incorporating a vehicle entertainment system, comprising:
an armrest module including an upper support surface;

a video system mounted within the armrest module for movement about a first axis and a second axis substantially perpendicular to the first axis;

the video system including an integrated housing supporting a video monitor and a video source, the housing including a front surface and a rear surface opposite the front surface, the rear surface functioning as part of the upper support surface when the video system is in its storage position, wherein the housing further includes first and second sides opposite each other, the first and second sides functioning as parts of opposite sides of the armrest module when the housing is disposed in a recess of the armrest module, the recess having third and fourth sides, each of the third and fourth sides shaped as a pair of oblique edges with a straight edge between the oblique edges, and each of the first and second sides is shaped as a pair of oblique edges with a straight edge between the oblique edges, wherein the shape of the first side is conformal with the shape of the third side when the housing is disposed in the recess and the shape of the second side is conformal with the shape of the fourth side when the housing is disposed in the recess.

6. The armrest/console according to claim 5, wherein the video source is a DVD player or hard drive.

7. The armrest/console according to claim 5, wherein the armrest module is selectively removeable from the armrest/console.

\* \* \* \* \*